United States Patent [19]

Steere et al.

[11] Patent Number: 5,104,536
[45] Date of Patent: Apr. 14, 1992

[54] POLYMERIC FILM FILTER ASSEMBLY

[75] Inventors: William C. Steere, Grass Lake; Jeff Lucas, Ypsilanti, both of Mich.

[73] Assignee: Gelman Sciences, Inc., Ann Arbor, Mich.

[21] Appl. No.: 659,581

[22] Filed: Feb. 22, 1991

[51] Int. Cl.$^5$ .............................. B01D 61/18
[52] U.S. Cl. ............................ 210/321.86; 210/446; 210/464
[58] Field of Search ............... 210/446, 474, 482, 464, 210/321.86; 156/217, 227, 275.1

[56] References Cited
U.S. PATENT DOCUMENTS

| | | | |
|---|---|---|---|
| 3,506,130 | 4/1970 | Shaye | 210/446 X |
| 3,675,780 | 7/1972 | Marshall et al. | 210/446 |
| 4,035,304 | 7/1977 | Watanabe | 210/446 X |
| 4,265,760 | 5/1981 | Abel et al. | 210/446 X |

Primary Examiner—Frank Spear
Attorney, Agent, or Firm—Krass & Young

[57] ABSTRACT

A flexible inflatable filter assembly or device is provided in pouch or sleeve form for filtration of fluid comprising at least one fluid porous dead-end filter panel located internally within the pouch or sleeve with the opposite end edges of the filter panel sealed respectively to first and second polymer film fluid-barrier panels that form the pouch or sleeve so that the respective pouch or sleeve is divided into separate internal chambers, one of which may serve for collection of permeate fluid. The device has a flat two-dimensional form when empty but can assume an inflated three-dimensional form when containing fluid under pressure. The device being constructed of sterilizable thin plastic film, can be cut into transverse segments (for purposes of analysis, further processing, etc.) which can be a segment comprising each filter panel or a segment containing a liquid or non-liquid fluid permeate.

25 Claims, 3 Drawing Sheets

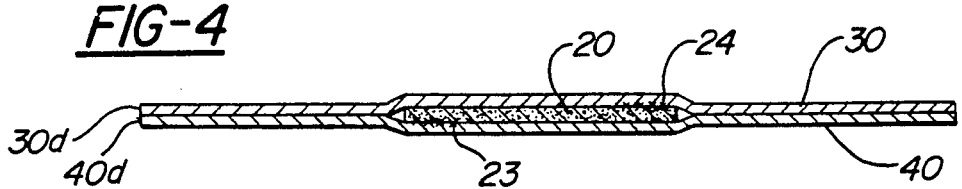
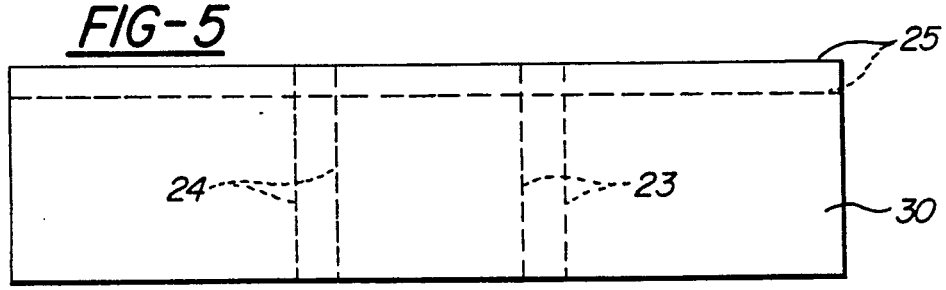
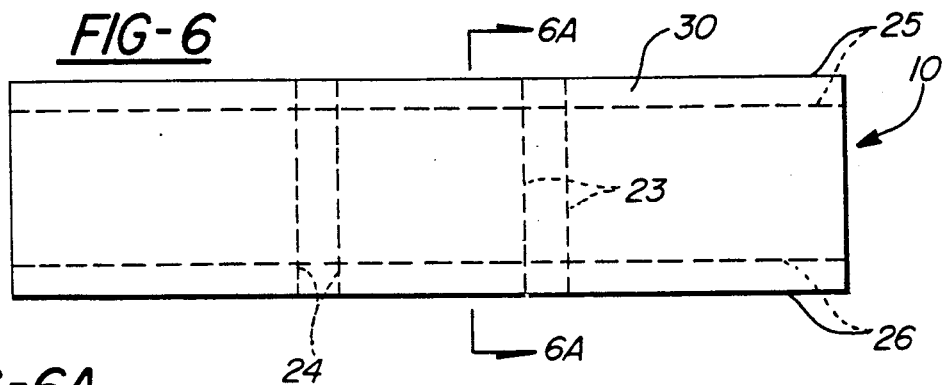
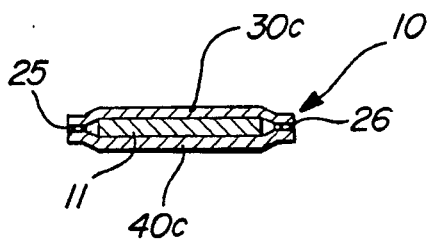
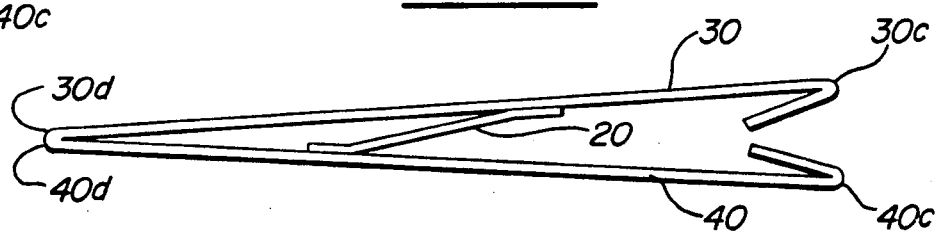
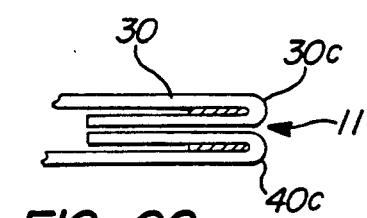
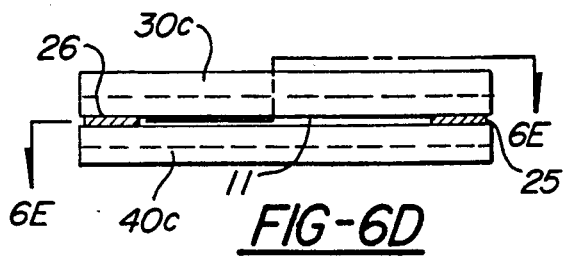

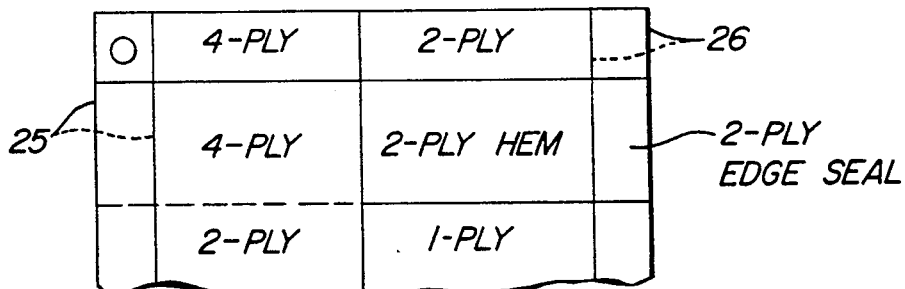
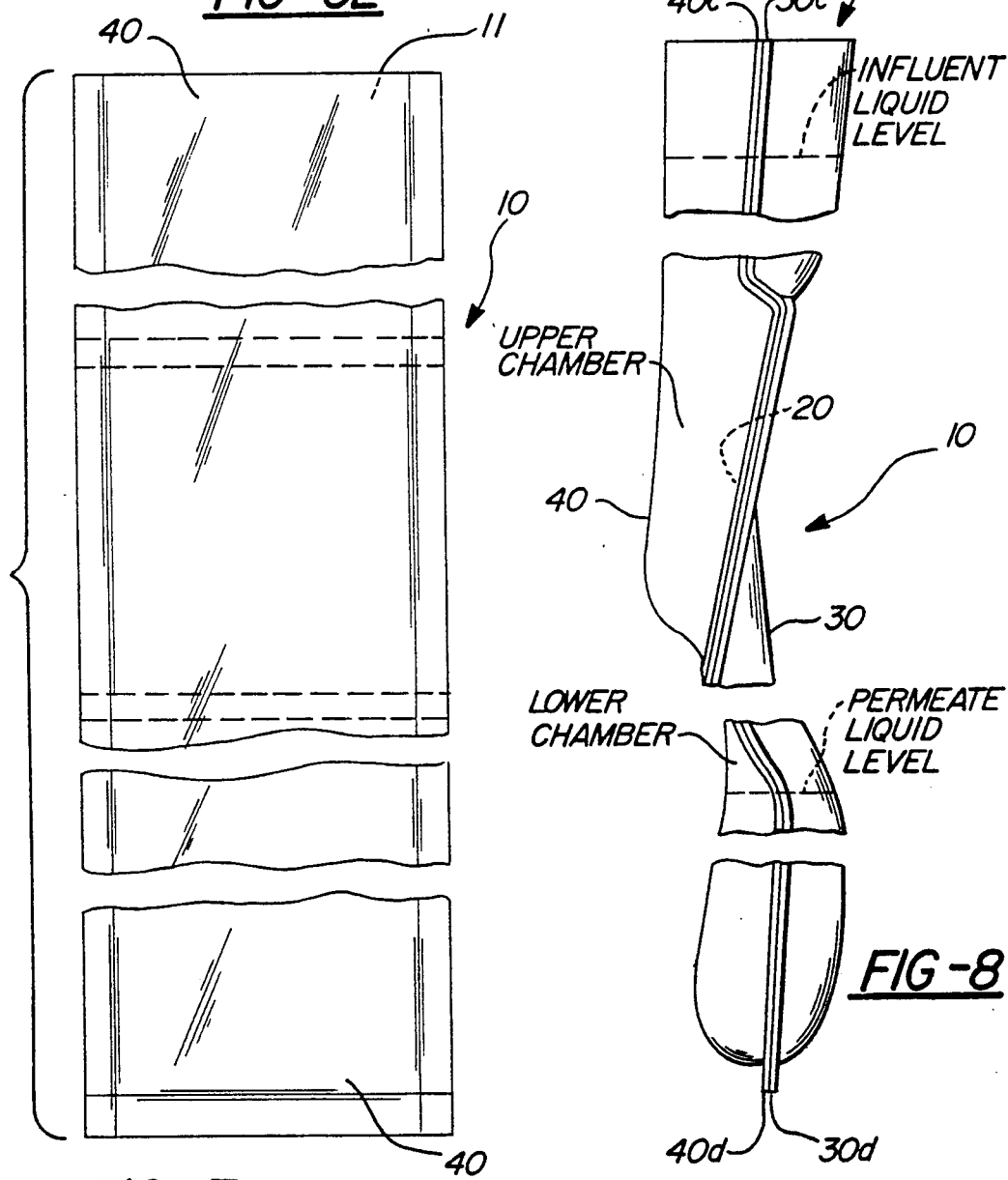

POLYMERIC FILM FILTER ASSEMBLY

FIELD OF THE INVENTION

This invention concerns polymeric film filter assemblies and, more particularly, fluid inflatable pouch-like or sleeve-like dead-end filter assemblies which are useful for macro- and micro-filtration of aqueous and non-aqueous fluids.

BACKGROUND OF THE INVENTION

Assemblies or packages for filtering fluids introduced therein are well-known in the art. One such package described in U.S. Pat. No. 3,092,249 employs a container made of air impervious material and has therein an opening or mouth closed by an air sterilizing filter so that the only ingress for air to enter the container is through the filter. Another apparatus described in U.S. Pat. No. 4,777,137 employing a complex tubular sleeve, the bottom of which is closed by a sterile microporous member filter sealingly fixed on its periphery to one end of the sleeve is used to collect and filter a liquid sample to be tested. This is done so that the downstream side of the filter can be contacted with a culture medium for purposes of counting living microorganisms contained in the liquid sample. A similar apparatus is described in U.S. Pat. No. 4,640,777. Another assembly described in U.S. Pat. No. 4,702,834 for filtering liquids employs a plastic laboratory filterware comprising upper and lower chambers separated by a neck portion which includes a plastic support plate. A cellulose nitrate filter membrane is ultrasonic welded to the support plate for filtering liquids through the neck portion. The assembly is a bulky rigid structure, however, and is uneconomical for one-time use. Another pre-sterilized bag assembly in association with a sterilizing microporous filter described in U.S. Pat. No. 4,964,261 employs a flexible sterile tubular bag with a single inlet for introducing sterile solutions but the microporous filter is located outside of the bag.

OBJECTS OF THE INVENTION

It is an object of the invention to provide an economical lightweight unitary polymer film sleeve filter device for filtering a stream of liquid or gaseous fluid therethrough and optionally for collecting the filtered fluid in the device.

It is a further object to provide a fluid filter device constructed of lightweight polymeric film that is inflatable into separate chambers from a planar two dimensional geometry to a three dimensional hollow sleeve or bag geometry in which the separate chambers are partitioned by interior dead-end filter panel means.

Another object is to provide a single-use sterile polymeric film filter tube device containing dead-end sterilizing filter membrane means therein for sterilizing aqueous fluid flowing therethrough and optionally collecting the thus sterilized fluid in the device while maintaining it within a sterile chamber.

These and other objects, features and advantages are realized from the following description of preferred and best mode embodiments of the invention.

SUMMARY OF THE INVENTION

The filter device of the invention in a preferred embodiment comprises a fluid porous dead end filter panel between first and second polymer film fluid-barrier panels forming together an open-ended fluid-inflatable hollow unitary pouch or sleeve. As will be seen, in an embodiment where the first and second fluid-barrier panels are separate panels the device is in sleeve form and where the first and second panels are formed by folding a single long panel in half upon itself (i.e., are unitary), the device is in pouch form. The filter panel has spaced apart first and second transverse end edges located in the pouch or sleeve with the first transverse end sealed to the first polymer film panel and the other transverse end sealed to the second polymer film panel. Thus the filter panel crosses over from one panel to the other panel. In this way the pouch or sleeve interior is fluid-sealingly partitioned by the filter panel into two chambers—a first chamber for receiving axial flow of a fluid to be brought into contact with the upstream surface of the filter panel and to pass therethrough and be filtered thereby and a second chamber for receiving the permeate fluid through the downstream surface of the filter panel. The filter panel and the polymer film panels which together form a fluid-tight pouch or sleeve can be constructed in any suitable way but preferably ar formed in side-edge-sealed sandwich relation. The resulting device in sleeve form has a first open ingress end and a second open exit end and in pouch form has an open ingress end. In either form, the device may be provided with suitable closure means such as a transverse clamp, weld seal, tape or cover sealing the one open end or both the first and second open ends, as the case may be. Preferably, the filter device is sterilized by suitable means such as gamma radiation, autoclaving, treating with ethylene oxide, or the like. The filter panel may comprise a membranous or non-membranous filter panel material or may combine both materials, e.g. with the latter material laminated as a prefilter to the former material. The membranous material may be a hydrophilic membrane or a hydrophobic membrane and may be macroporous or microporous, and more preferably is a polymeric microporous membrane material. The mean pore sizes for suitable microporous membranes is not critical and for example may be between 0.01 $\mu$m and 10 $\mu$m. Microporous membranes have found widespread use in removing fine particulate matter such as dust and bacteria from liquids and gases. Examples of suitable membranes are nylon, nitrocellulose, mixed esters of cellulose, polycarbonate, polyethersulfone, acrylic copolymer and other similar membranes, unsupported or supported by a polyester web or fabric, laminated polypropylene web support or other support which may be per se conventional.

Suitable nonmembranous porous materials are woven and nonwoven fabrics, glass fiber mats, melt blown mats, felts, and the like. These porous nonmembranous materials can be used as a filter panel material or as a prefilter for the present membranous filtrations.

The filter device of the invention in a preferred embodiment has a planar two dimensional geometry. This form has a space saving advantage for purposes of packaging, warehousing, distribution, etc. The device however is usefully inflatable by introducing either aqueous or non-aqueous fluid, under pressure. In the case of aqueous fluid, for example, this may be done by pressure of gravity, via the first open, upstream end of the device and allowing the fluid to flow downward into the first chamber whereupon the device gradually inflates to a three dimensionally hollow geometry enabling the fluid to gravitate to, and have direct contact with the filter panel for filtration in due course.

The invention contemplates a preferred embodiment of the filter device comprising at least two dead-end filter panels axially spaced apart in the sleeve device whereby the sleeve interior is partitioned into corresponding upstream and downstream chambers. The volume capacity of such chambers is selected so that each downstream chamber is large enough to accommodate the flow of permeate from its upstream chamber.

In a further preferred embodiment of the multi-chamber device described, the porosity of each filter panel is selected such as to provide a graded series of decreased average porosity per panel thereby avoiding undue blockage at each panel by overly large particulates and enabling collection of the desired permeate as well as size-graded particulates from each of the respective upstream chambers.

The invention in another aspect concerns one preferred method embodiment of forming a tubular filter device comprising a filter panel having first and second side edges and first and second transverse end edges in layered relation between first and second polymer film barrier panels having first and second side edges corresponding to said filter panel first and second side edges. The method comprises joining the first transverse end edge of the filter panel by weld means with the first barrier panel; joining the second transverse end edge of the filter panel by weld means with the second barrier panel; joining the respective first side edges of the filter panel, first barrier panel, and the second barrier panel by weld means; and joining the respective second side edges of the filter panel, the first barrier panel, and the second barrier panel by weld means. For this purpose, the means of welding may be conventional means such as adhesive sealing, taping, heat sealing, hot wire sealing, ultrasonic sealing, and the like. The placement and welding of the respective panel is suitably done in four cycles: first, the filter panels according to one preferred embodiment is superposed on the first barrier panel at a position intermediate or midway of the length thereof and its first transverse end is welded to that barrier panel; next, the reverse side of the filter panel is superposed on the second barrier panel midway at a position intermediate or midway of the length thereof and its second transverse end is welded to that barrier panel; the three panels are then superposed and their side edges, one side after the other, are lengthwise welded to provide a sleeve structure with an internal dead-end filter panel located intermediate first and second open ingress and exit ends.

In an embodiment where the first and second fluid-barrier panels are separate panels, the device as indicated, is in sleeve form having a first open ingress opening end and a second open exit end. Where the first and second panels are provided by folding a single long panel in half upon itself, the device is in pouch form having a single open end or ingress end. In a preferred embodiment, the open ingress end prior to side-edge sealing is provided with a cuff or hem by folding the panel open end so that after side-edge sealing the panel and margin defining the open end has 4-ply thickness rather than 2 ply thickness. This gives the structure greater open end strength and also, it is found, enables the device to be easily manipulated at the open ingress end from a two-dimensional closed end shape to a three-dimensional hollow shape suitable as intended for introducing a fluid. The method of sealing end-edge folding, etc. can be carried out in any suitable way and can be done manually or can be automated or semi-automated.

BRIEF DESCRIPTION OF THE ILLUSTRATED EMBODIMENTS

The invention in preferred embodiments will now be described in reference to the annexed drawings in which:

FIG. 1 in perspective illustrates in a filter device a step in the method of welding one transverse edge of a filter panel to a first barrier panel;

FIG. 4 is a cross sectional view of the filter device taken on line 4—4 of FIG. 3;

FIGS. 5 and 6 are top views of the device showing successive steps in the method of side edge welding;

FIG. 6A is an end view in elevation of the device of FIG. 6;

FIG. 6B is a side view similar to FIG. 2 of the panels of the device being assembled;

FIG. 6C is a fragmentary side view of the ingress end of the device;

FIG. 6D is an end view of the ingress end of the device;

FIG. 6E is a fragmentary plan view of the device taken on lines 6E—6E of FIG. 6D.

FIG. 7 is a fragmented plan view of the filter device in a vertical position in sleeve form open at the top for gravity loading of a liquid and weld sealed at the bottom end edge for collection of filtered liquid; and FIG. 8 is a fragmented side view of the device loaded with unfiltered liquid in the first chamber and with filtered liquid in the second, lower chamber.

DETAILED DESCRIPTION OF THE PREFERRED EMBODIMENTS

Figure 1:
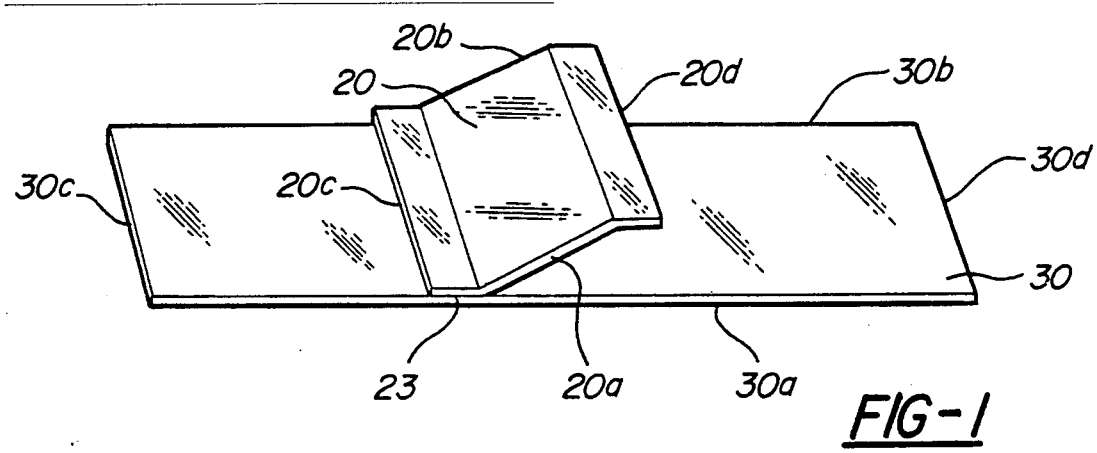
FIG. 1A is a side view of a preferred unitary filter panel having three layers: a membranous or nonmembranous filter panel and coextensive facing and backing support panels.
Figure 1A:
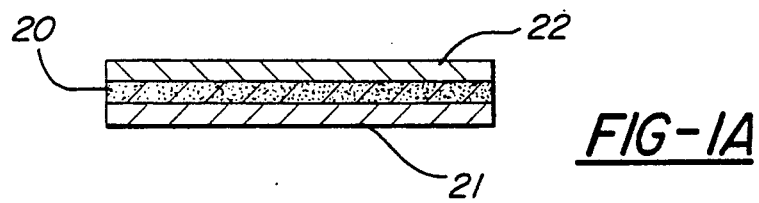
Figure 2:
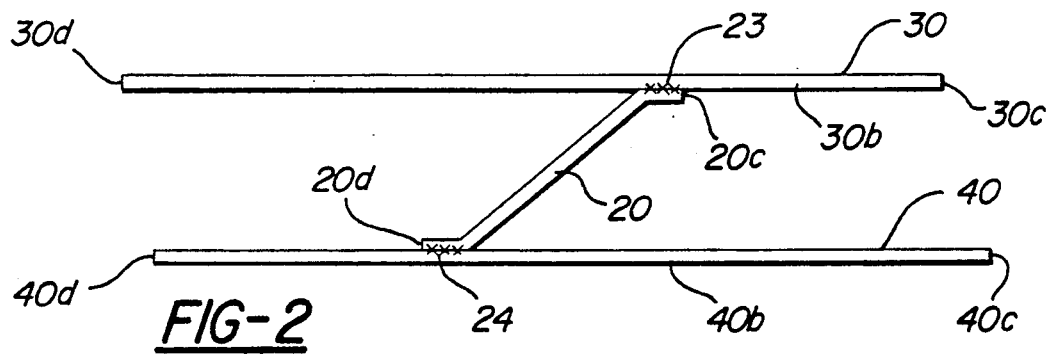
FIG. 2 is a similar illustration showing a second step in the method of welding the opposite transverse edge of the filter panel to a second barrier panel.
Figure 3:
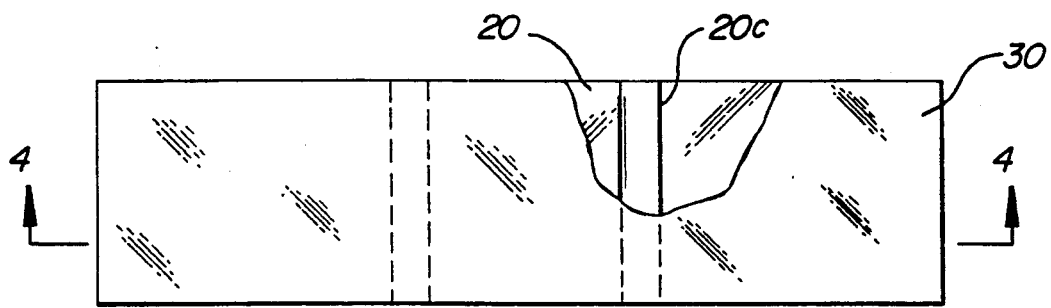
FIG. 3 is a top view of a filter device partly cut away to show the relative lengthwise position of the filter panel when the panels are assembled in sandwich relation.

The filter device 10 according to a preferred embodiment of the invention as seen in FIGS. 6, 7 and 8 comprises a porous filter panel 20 and first and second polymer film fluid barrier panels 30,40 which preferably are transparent. The filter panel 20 has first and second side edges 20a,20b, and leading and trailing end edges 20c,20d. The barrier panels 30,40 each have respectively first and second side edges 30a,30b/40a,40b and first and second end edges 30c,30d/40c,40d, unitary out-folded cuff panels (not shown) or unitary in-folded hem panels as shown in FIG. 6B. In a preferred embodiment, the barrier panels are in the form of a single long panel as shown in FIG. 6B which may include the just described unitary out- or in-folded cuff or hem panels. The device can be made from conventional materials in any suitable way. As shown in the series of FIGS. 1 to 6, the device in one preferred method can be made from a filter panel and two liquid barrier panels by a 4-cycle weld procedure: 2 transverse welds 23,24 followed by 2 edge-length welds 25,26. In FIG. 1, the filter panel 20 is joined at its leading end edge 20c to the first barrier panel 30 by a transverse seal or weld 23 employing a suitable heat sealing tool or an adhesive seal. The filter panel 20 can comprise one or more membranous (e.g. a microporous polyethersulfone membrane) or non-membranous (e.g., a fiberglass) filter panels. As an alternative shown in FIG. 1A, it can comprise a facing support 21 and a backing support 22 each being a durable strength material such as a polymer web or fabric. The thus joined parts are turned upside down as shown in FIG. 2 and transverse sealed or welded together at the trailing end edge 20d by weld 24. The three panels 20,30,40 are next brought into superposed alignment as shown in FIGS. 3 and 4. The assembly is then edge welded first at 25 in FIG. 5 and then at 26 in FIG. 6 thus leaving open-ended the fluid ingress 11 opening of FIG. 6A between the film layer panel ends 30c, 40c and (not shown) panel ends 30d,40d.

The filter device 10 can be sealed or welded at one end to form a sleeve as shown in FIG. 7 or can be sealed at both ends to form a sealed pouch, preferably in sterilized packaged form. For the further processing of the preferred embodiment shown in FIG. 6B, prior to edge sealing, the hem panels are brought to the fully folded position shown in FIG. 6C and are end sealed leaving an ingress opening 11 after edge sealing as shown in FIG. 6D.

FIG. 6E shows the preferred embodiment of the open end of the device having a hemmed opening 11 with 4-plies. As shown, suspension or perforation means are provided in this multi-ply strengthened portion, by means of which suspension means the device can be held and supported vertically, e.g., through use of an S-hook or other support means attached or anchored to a stationary support. For filtering a liquid as shown in FIG. 8, the device can conveniently be held vertically and the liquid introduced through the open end 11 to cause the upper chamber to be filled and, being flexible, to balloon out in contact with the filter panel 20. When using transparent barrier film material, the progress of liquid flow in the device can readily be followed. The liquid thus can be seen to pass through the filter panel (under pressure of gravity) into the lower chamber and form there a body of permeate liquid. If desired, to increase the downstream pressure, the open end 11 can be sealed by clamping and the upper chamber advantageously can be compressed manually (or by other means such as by pressure between opposed rollers) to correspondingly increase the filtration flow rate of the liquid. Following filtration, the liquid filtrate can be transferred to a different container or can be stored under seal in the lower chamber or processed further. Also, if desired, the device, being of thin film construction, can be cut (e.g., with scissors or other suitable means) as transverse sections of those segments of the device which are to be retained, e.g., for microbial analysis, colony counting, sampling, etc., such as the filter panel itself or, as indicated, the lower chamber with its liquid content. In cases where the device comprises two or more axially spaced apart filter panels, these can each be cut out and saved separately.

What is desired to claim as our exclusive property in the invention, as described, is the following:

1. A flexible tubular filter device comprising a fluid porous dead and filter panel between first and second polymer film fluid-barrier panels forming together an open-ended fluid-inflatable hollow unitary pouch, the filter panel having spaced apart transverse first and second end edges located in the pouch with the first transverse end sealed to the first polymer film panel and with the other transverse end sealed to the second polymer film panel such that the porous panel crosses over from one panel to the other panel whereby the pouch interior is fluid sealingly partitioned by the filter panel into a first chamber for receiving axial flow of a fluid to be brought into contact with the upstream surface of the filter panel and to pass therethrough and be filtered thereby and a second chamber for receiving the permeate fluid through the downstream surface of the filter panel, the filter device having sealed side edges, a sealed end edge and an unsealed open end edge defining an open ingress end.

2. The filter device of claim 1 where the open ingress end is finished in the form of a cuff of hem.

3. The filter device of claim 2 wherein the cuff or hem comprises perforation means for suspending the filter device from a support.

4. A filter device according to claim 1 where the filter panel and the polymer film panels are formed in side-edge-sealed sandwich relation.

5. The filter device of claim 4 where the edge seals comprise weld seals.

6. A filter device according to claim 1 comprising edges forming ingress and egress means and removable closure means sealing the open egress means whereby the device is a pouch filter.

7. A filter device according to claim 6 where the open ingress end is finished in the form of a cuff or hem.

8. A filter device in pouch form with an open end according to claim 1 comprising closure means sealing the open end.

9. A sterile filter device according to claim 8 comprising sterile means sealing the open ingress end.

10. The filter device of claim 1 where the filter panel comprises a membranous filter panel material.

11. The filter device of claim 10 where the filter panel comprises a microporous filtration membrane.

12. The filter device of claim 10 where the filter panel comprises a hydrophilic polymeric microporous membrane.

13. The filter device of claim 10 where the filter panel comprises a hydrophobic polymeric microporous membrane.

14. The filter device of claim 10 where the membranous filter panel material comprises non-membranous porous laminar support material.

15. The filter device of claim 14 where the laminar support material comprises web or fabric material.

16. The filter device of claim 14 where the laminar support material comprises a membrane facing support and a membrane backing support.

17. The filter device of claim 1 where the filter panel comprises a non-membranous filter panel material.

18. The filter device of claim 1 that is inflatable such that aqueous fluid introduced into the first chamber under pressure causes the first chamber to be inflated from a planar two dimensional geometry to a three dimensional hollow geometry enabling the fluid to have direct contact with and pass through the filter panel.

19. The filter device of claim 18 where the first chamber comprises open end means allowing liquid to be introduced under pressure of gravity whereby the first chamber can be inflated.

20. The filter device of claim 1 comprising at least two dead end filter panels axially spaced apart in the pouch whereby the pouch is partitioned into corresponding upstream and downstream chambers.

21. The filter device of claim 20 where the porosity of each filter is selected such that the panels provide a graded panel series of decreasing porosity thereby enabling collection of permeate and graded particulates from the separate chambers.

22. A filter device according to claim 1 where the first and second fluid barrier panels are in the form of a single long panel folded upon itself.

23. A method of forming a tubular filter device having an open ingress end comprising a filter panel having first and second side edges and first and second transverse end edges in layered relation between a single long panel foldable upon itself to form first and second polymer film fluid barrier panels, said single long panel having a length sufficient when folded upon itself to provide a pouch form and having first and second side edges corresponding to said filter panel first and second side edges comprising the steps of:
 joining the first transverse end edge of the filter panel and the first barrier panel by fluid seal means;
 joining the second transverse end edge of the filter panel and the second barrier panel by fluid seal means;
 folding said long panel upon itself;
 joining the respective first side edges of the filter panel and the barrier panels by fluid seal means; and
 joining the respective second side edges of the filter panel and the barrier panels by fluid seal means.

24. A method according to claim 23 where the fluid seal means comprise weld means.

25. A method according to claim 23 comprising providing the open ingress end with a cuff or hem prior to side edge sealing.

* * * * *

UNITED STATES PATENT AND TRADEMARK OFFICE
CERTIFICATE OF CORRECTION

PATENT NO. : 5,104,536

DATED : April 14, 1992

INVENTOR(S) : Steere et al

It is certified that error appears in the above-identified patent and that said Letters Patent is hereby corrected as shown below:

Column 2, line 21, delete "ar" and insert --are--;

Column 5, line 63, delete "and" and insert --end--;

Column 6, line 14, delete "of" and insert --or--;

Column 7, line 2, delete "filter is" and insert --filter panel is--;

Column 8, line 1, delete "s aid" and insert --said--.

Signed and Sealed this

Thirteenth Day of July, 1993

Attest:

MICHAEL K. KIRK

*Attesting Officer*      *Acting Commissioner of Patents and Trademarks*